No. 828,341. PATENTED AUG. 14, 1906.
T. ROBINS, Jr. & E. E. HERSH.
DRIVE FOR CONVEYERS.
APPLICATION FILED NOV. 17, 1903.
2 SHEETS—SHEET 1.
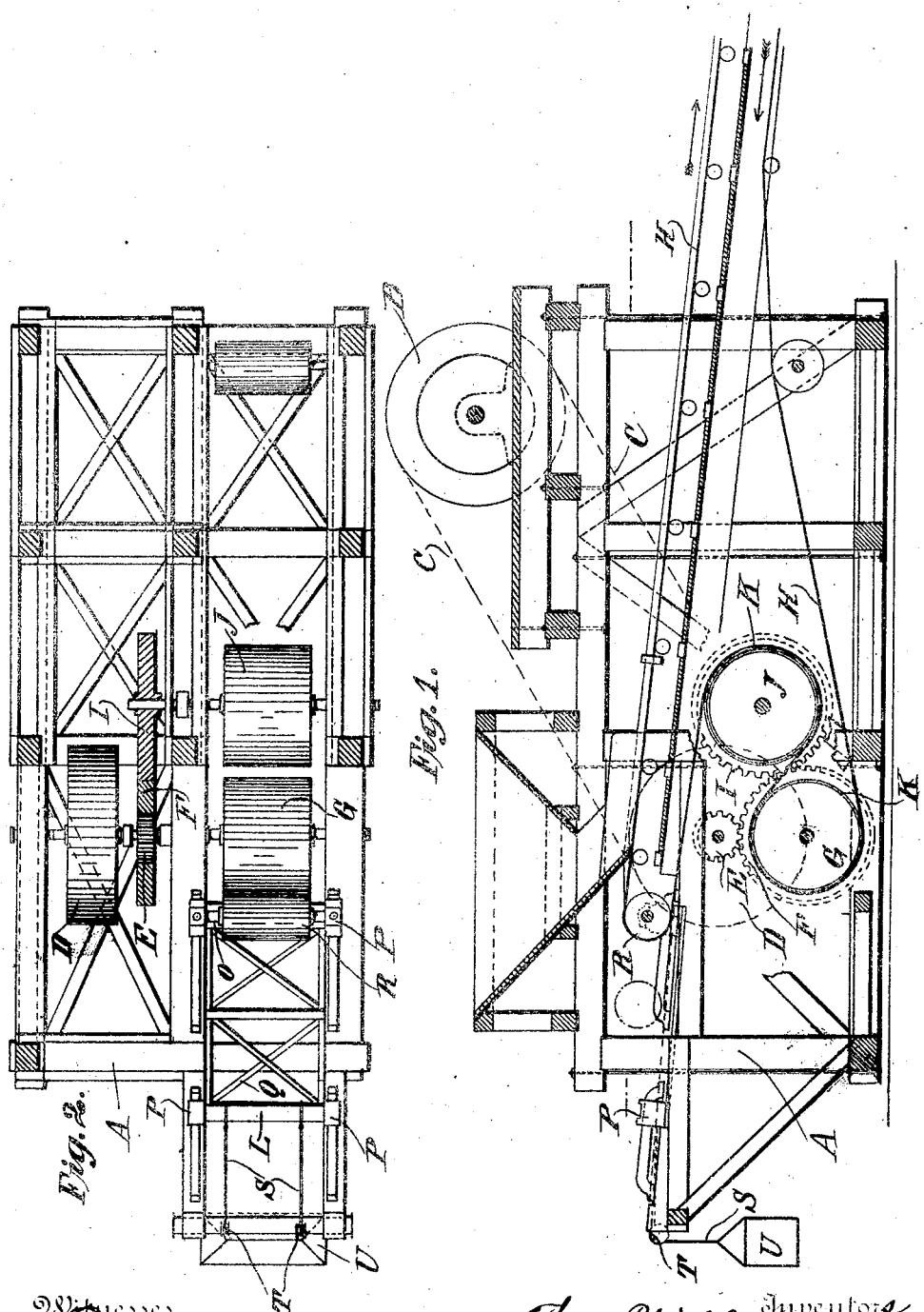

No. 828,341. PATENTED AUG. 14, 1906.
T. ROBINS, Jr. & E. E. HERSH.
DRIVE FOR CONVEYERS.
APPLICATION FILED NOV. 17, 1903.

2 SHEETS—SHEET 2.

UNITED STATES PATENT OFFICE.

THOMAS ROBINS, JR., AND EDGAR E. HERSH, OF NEW YORK, N. Y., ASSIGNORS TO ROBINS CONVEYING BELT COMPANY, OF NEW YORK, N. Y., A CORPORATION OF NEW JERSEY.

DRIVE FOR CONVEYERS.

No. 828,341.      Specification of Letters Patent.      Patented Aug. 14, 1906.

Application filed November 17, 1903. Serial No. 181,516.

*To all whom it may concern:*

Be it known that we, THOMAS ROBINS, Jr., and EDGAR E. HERSH, citizens of the United States, and residents of the borough of Manhattan, city, county, and State of New York, have invented certain new and useful Improvements in Drives for Conveyers, of which the following is a specification accompanied by drawings.

This invention relates to drives for conveyers; and its objects are to improve upon the construction and efficiency of such apparatus, enabling a very long belt conveyer to be kept taut on its upper side and preventing an accumulation of slack between the driving-pulleys, thereby enabling the full driving power of each to be utilized.

Further objects of the invention will hereinafter appear; and to these ends the invention consists of apparatus for carrying out the above objects embodying the features of construction, combinations of elements, and arrangement of parts having the general mode of operation substantially as hereinafter fully described and claimed in this specification and shown in the accompanying drawings, in which—

Figure 3:
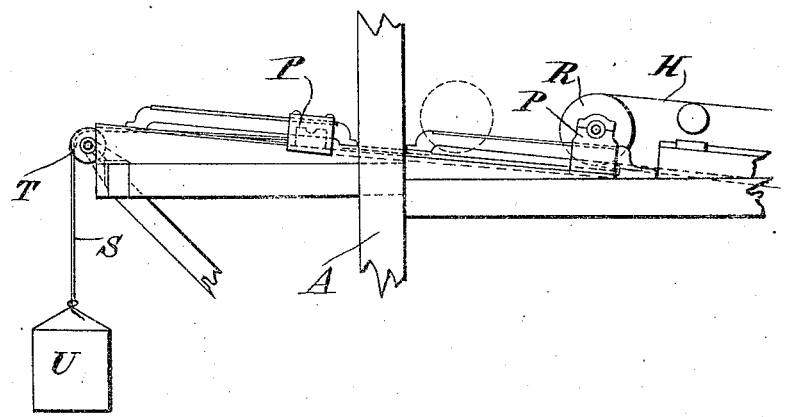
Figure 4:
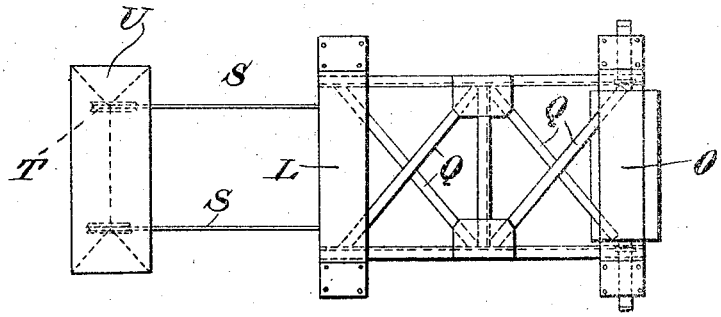

Figure 1 is a side elevation, partly in section, of apparatus embodying the invention. Fig. 2 is a plan view of the same, partly in section. Fig. 3 is an enlarged detail side elevation of the variable take-up. Fig. 4 is an enlarged plan view of the take-up.

Referring to the drawings, A represents a suitable framework for the apparatus, upon which is mounted the driving-pulley B, which may be driven from any suitable source of power and is shown connected in this instance by belting C to the driven pulley D. Upon the shaft of the driven pulley D is a pinion E, meshing with a gear F upon the shaft of the pulley G, over which the conveyer-belt H runs. The gear F meshes with the gear I on the shaft of the pulley J, over which the belt H also runs.

The conveyer-belt H is connected to be driven in the direction of the arrows shown in Fig. 1 by means of the pulleys G and J. These two pulleys, as shown in the drawings, are constructed with the same original diameter, but the working diameter of the pulley J is preferably made slightly greater than that of the pulley G by any suitable means— as, for instance, by the use of rubber lagging K, suitably riveted or otherwise secured to the periphery of the pulley. In practice there may be two plies of lagging K on the pulley G and three plies of lagging on the pulley J, so that the working diameter of the pulley J may be about one-quarter of an inch greater than that of G. In addition to the driving-pulleys G and J of different diameters a variable take-up is provided, shown in this instance as consisting of frames L and O, the slides P of which are rigidly connected at their under sides by the framework Q. The tail-pulley R in this instance has its bearings, as shown, in the boxes on the slides P. To the frame L are secured connectors S, which may be of wire rope, passing over the pulleys T and secured to a heavy weight U. By this combined arrangement of pulleys G and J of different diameters and the variable take-up mechanism a very long belt is kept taut on its upper side and is perfectly driven from its tail end. Instead of there being an accumulation of slack belt between the pulleys G and J, as would be the case if the pulleys were of the same diameter and there were no variable take-ups, according to this invention the belt is kept tight between the pulleys and the full driving power of each is utilized. The strain on the belt while starting and stopping and while running is kept equalized, and yet the slack is at all times taken up without undue strain being put upon the belt. It is preferable to use two tandem pulleys G and J in order to get the large amount of belt contact necessary for a drive of this kind, and the increased diameter of the pulley J tending to drive the belt slightly faster than the smaller pulley G aids in keeping the belt tight between the pulleys. Instead of using the lagging as described a similar result may be accomplished by varying the toothed gearing, so that the pulley J will rotate at a slightly-greater speed than the pulley G. It would also be possible to have the pulley J made to a special size, so as to be slightly larger than the pulley G.

Obviously some features of this invention may be used without others and the invention may be embodied in widely-varying forms.

Therefore, without limiting the invention to the construction shown and described nor enumerating equivalents, we claim, and desire to obtain by Letters Patent, the following:

1. The combination with a conveyer-belt, of two drive-pulleys over which the belt runs, one having greater peripheral speed than the other, for substantially the purposes set forth.

2. The combination with a conveyer-belt, of a freely-movable slide, a tail-pulley mounted on said slide over which the conveyer-belt runs, means acting upon said slide to keep the upper side of the conveyer-belt taut, and belt-driving devices which drive the belt toward the tail-pulley arranged adjacent to said slide, for substantially the purposes set forth.

3. The combination with a conveyer-belt, of two drive-pulleys over which the conveyer-belt runs, one being of larger diameter than the other, and means for keeping the upper side of the conveyer taut, for substantially the purposes set forth.

4. The combination with a conveyer-belt, of two drive-pulleys arranged in tandem over which the conveyer-belt runs, one of said pulleys having greater peripheral speed than the other, and a variable take-up exerting a constant tension in the conveyer to keep the upper side of the belt taut, for substantially the purposes set forth.

5. The combination with a conveyer-belt, of a plurality of drive-pulleys over which the belt runs, the forward pulley and the mechanism for imparting rotation thereto being adapted to produce a slightly greater peripheral speed than the rear pulley and mechanism for imparting rotation thereto, for substantially the purposes set forth.

In testimony whereof we have signed this specification in the presence of two subscribing witnesses.

THOMAS ROBINS, JR.
EDGAR E. HERSH.

Witnesses as to Thomas Robins, Jr.:
EMIL CHAS. EGER,
H. G. OGDEN, JR.

Witnesses as to Edgar E. Hersh:
H. G. OGDEN, JR.,
H. L. OBERTENFFER.